United States Patent
Testin (10) Patent No.: US 7,679,680 B2
(45) Date of Patent: Mar. 16, 2010

(54) APPARATUS IN A TV RECEIVER FOR AUTOMATICALLY DETECTING THE TYPE OF KEYBOARD ATTACHED THERETO

(75) Inventor: William John Testin, Indianapolis, IN (US)

(73) Assignee: Thomson Licensing, Issy les Moulineaux (FR)

( * ) Notice: Subject to any disclaimer, the term of this patent is extended or adjusted under 35 U.S.C. 154(b) by 1066 days.

(21) Appl. No.: 10/544,751

(22) PCT Filed: Feb. 12, 2004

(86) PCT No.: PCT/US2004/004209

§ 371 (c)(1), (2), (4) Date: Aug. 8, 2005

(87) PCT Pub. No.: WO2004/075529

PCT Pub. Date: Sep. 2, 2004

(65) Prior Publication Data

US 2006/0087597 A1 Apr. 27, 2006

Related U.S. Application Data

(60) Provisional application No. 60/448,603, filed on Feb. 14, 2003.

(51) Int. Cl.
*H04N 7/00* (2006.01)
*H03K 17/94* (2006.01)

(52) U.S. Cl. .................................. 348/552; 341/22

(58) Field of Classification Search ......... 348/552–555, 348/180, 844; 341/22, 26, 27; 710/67; 345/168
See application file for complete search history.

(56) References Cited

U.S. PATENT DOCUMENTS 4,251,805 A  2/1981  Holzmann et al.
(Continued)

FOREIGN PATENT DOCUMENTS

EP  0773674  5/1997
(Continued)

OTHER PUBLICATIONS

"Keyboard Detection in a Pen-Based Computer System" IBM Technical Disclosure Bulletin, IBM Corp. New York, US, vol. 37, No. 6A, Jun. 1, 1994, pp. 515-516.
(Continued)

*Primary Examiner*—Victor R Kostak
(74) *Attorney, Agent, or Firm*—Robert D. Shedd; Joseph J. Opalach; Reitseng Lin (57) ABSTRACT

A television apparatus includes a front panel keyboard having first and second keys, and a controller for detecting a type of operational logic of the front panel keyboard. The controller applies a keyboard operational voltage to the front panel keyboard according to the detected type of operational logic. If the controller determines that the type of operational logic is negative, the controller applies the keyboard operational voltage to the front panel keyboard. Otherwise, if the controller determines that the type of operational logic is positive, the controller applies no keyboard operational voltage to the front panel keyboard.

24 Claims, 5 Drawing Sheets

U.S. PATENT DOCUMENTS

| | | | |
|---|---|---|---|
| 4,279,035 A * | 7/1981 | Skerlos | 455/158.3 |
| 4,318,087 A * | 3/1982 | Wilson | 341/26 |
| 4,475,164 A * | 10/1984 | Sado | 708/109 |
| 4,543,564 A * | 9/1985 | Audoin et al. | 341/24 |
| 4,626,830 A * | 12/1986 | Noens et al. | 341/22 |
| 4,727,478 A * | 2/1988 | Endfield et al. | 710/67 |
| 5,036,261 A | 7/1991 | Testin | |
| 5,151,554 A | 9/1992 | Matsuda | |
| 5,459,507 A * | 10/1995 | Sakuma et al. | 725/152 |
| 5,729,222 A * | 3/1998 | Iggulden et al. | 341/31 |
| 5,861,822 A | 1/1999 | Park et al. | |
| 5,872,561 A | 2/1999 | Figie et al. | |
| 6,011,328 A | 1/2000 | Smith | |
| 6,563,434 B1 * | 5/2003 | Olodort et al. | 341/22 |
| 6,587,067 B2 * | 7/2003 | Darbee et al. | 341/176 |
| 7,532,251 B2 * | 5/2009 | Testin et al. | 348/553 |
| 2002/0024504 A1 * | 2/2002 | Kao et al. | 345/168 |
| 2003/0145135 A1 * | 7/2003 | Kang | 710/1 |

FOREIGN PATENT DOCUMENTS

| | | |
|---|---|---|
| JP | 53131716 A | 11/1978 |
| JP | 63182730 A | 7/1988 |
| JP | 3176714 A | 7/1991 |
| JP | 4211820 A | 8/1992 |
| JP | 9073352 A | 3/1997 |
| JP | 10283094 A | 10/1998 |

OTHER PUBLICATIONS

Kenneth J. Tuner et al: "Dill: Specifying Digital Logic in LOTOS" Proc. Formal Description Techniques VI, 1994, pp. 71-86.

Search Report dated Oct. 27, 2004.

\* cited by examiner

APPARATUS IN A TV RECEIVER FOR AUTOMATICALLY DETECTING THE TYPE OF KEYBOARD ATTACHED THERETO

CROSS-REFERENCE TO RELATED APPLICATIONS

This application claims the benefit, under 35 U.S.C. §365 of International Application PCT/US2004/004209, filed Feb. 12, 2004, which was published in accordance with PCT Article 21(2) on Sep. 2, 2004 in English and which claims the benefit of U.S. provisional patent application No. 60/448,603, filed Feb. 14, 2003.

TECHNICAL FIELD OF INVENTION

This invention relates to the field of television receivers, and, more particularly, to apparatus in a television receiver for automatically detecting the type of keyboard attached to the television receiver.

BACKGROUND OF THE INVENTION

Most television (TV) apparatus includes a front panel keyboard for a user to operate the television apparatus. A television apparatus normally includes a controller for receiving, detecting, identifying key activation signals from the front panel keyboard, and operating the television according to the function of the key being activated, for example, by pressing or touching. The front panel keyboard may include a top light or a backlight for lighting the keyboard when the television apparatus has been powered on. In addition, the front panel keyboard may have a power LED to indicate that the TV is "on". The top light, backlight, or power LED is turned on normally by a signal, such as a voltage, sent by the controller to the top light, backlight or power LED. The term "television apparatus" as used herein includes TV receivers having a display screen (commonly called TV sets), TV receivers without a display screen such as VCRs, VCPs (videocassette players), set-top boxes (such as cable boxes and satellite receivers), and Videodisk players.

In assembling a television apparatus, the front panel keyboard normally is one of the last few tasks to be installed. However, there are generally two different types of front panel keyboard to be supported: one with negative operational logic and the other with positive operational logic. In a keyboard with negative operation logic, the controller should provide a keyboard operational voltage to the keyboard. This type of keyboard normally uses momentary contact switches. By contrast, in a keyboard with positive operational logic, the keyboard provides its own keyboard operational voltage and the controller does not have to provide one for the keyboard. In general, front panel keyboards with positive operational logic have pull-down resistors on keyboard sense lines to set a logic zero condition on the keyboard inputs until a logic one is provided by a contact closure on the keyboard. A keyboard employing positive logic may have touch buttons, which use a capacitance change near a button indicating that the button has been pressed (activated).

In order to handle these two different types of keyboard, one may use a different television controller for each type of the front panel keyboard. However, the approach would significantly increase the cost of a television. Therefore, there is a need to design a television controller and keyboards, such that the television controller can be used with both types of keyboards.

SUMMARY OF THE INVENTION

According to the principles of the invention, a television apparatus includes a front panel keyboard having first and second keys, and a controller for detecting a type of operational logic of the front panel keyboard. The controller applies a keyboard operational voltage to the front panel keyboard according to the detected type of operational logic.

If the controller determines that the type of operational logic is negative, the controller applies the keyboard operational voltage to the front panel keyboard. Otherwise, if the controller determines that the type of operational logic is positive, the controller applies no keyboard operational voltage to the front panel keyboard.

Each key when activated by a user sends a key activation signal to the controller through a keyboard sense line.

The front panel keyboard includes a light and the controller applies a voltage to turn on the light through a light control line. The controller detects the type of operational logic of the front panel by detecting an identification voltage applied by the front panel keyboard to a first control line. In one embodiment of the invention, the first control line is the light control line. If the identification voltage is detected, the controller determines that the type of operational logic of the front panel keyboard is positive and does not apply the keyboard operational voltage to the keyboard sense line. Front panel keyboards with positive operational logic typically have pull-down resistors on the keyboard lines to set a logic zero condition on the keyboard inputs until a logic one is provided by a contact closure on the keyboard. If the identification voltage is not detected, the controller determines that the type of operational logic of the front panel keyboard is negative and applies the keyboard operational voltage to the keyboard line through a keyboard control line.

According to the principles of the invention, a front panel keyboard using positive logic includes first and second keys sharing a keyboard sense line coupled to the controller of the television apparatus for the controller to detect that one of the two keys has been activated; an inverter to invert a key drive signal from the controller, wherein the controller sends the key drive signal to detect whether the activation signal is coming from the first key or the second key; and an AND gate for generating the key activation signal from the second key and the inverted key drive signal.

DETAILED DESCRIPTION

Figure 1:
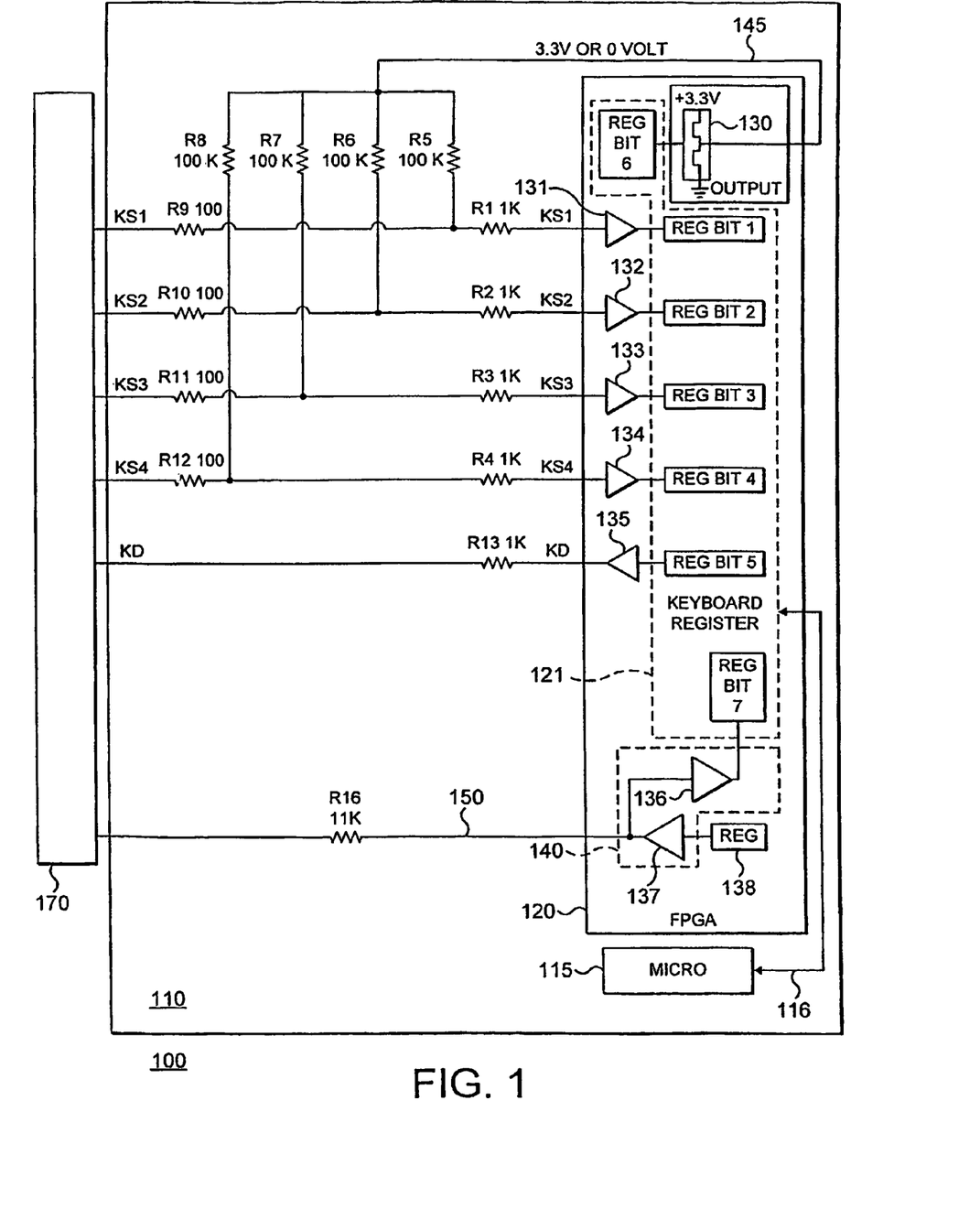
FIG. 1 is a portion of an illustrative television apparatus according the principles of the invention.

FIG. 1 illustrates a portion of a television apparatus 100 according to the principles of the invention. The television apparatus 100 includes a controller 110 and a front panel keyboard 170 sending user inputs to the controller 110. Upon receiving a user input, the controller 110 operates the television apparatus 100 according to the function specified in the user signal. Only those portions of the television apparatus necessary for understanding the present invention are included in FIG. 1. Others are omitted for simplicity. For example, the television apparatus 100 should also include a tuner, a display driver, and loudspeaker drivers.

The front panel keyboard 170 normally includes an array of keys. The array of keys and other components of the front panel keyboard 170 are not shown in FIG. 1, but these components will be illustrated in FIGS. 2 and 3. When a user activates a key, the front panel keyboard 170 sends a corresponding user signal in the form of a key activation signal to the controller 110 through keyboard sense lines KS1-KS4. The number of the keyboard sense lines may be different, depending on the number of keys to be supported in the front panel keyboard 170.

Normally, each of the keyboard sense lines KS1-KS4 is shared by more than one key, and the controller 110 should scan the front panel keyboard 170 by monitoring the state of a keyboard sense line having the key activation signal, while sending a keyboard drive signal to the front panel keyboard 170 through the keyboard drive line KD in order to determine exactly which key has been activated, as will be discussed in more detail in describing illustrative keyboards in FIGS. 2 and 3. The keyboard drive line KD illustratively includes a resistor R13 having a protection resistance (for example, one kilo-ohm).

The front panel keyboard 170 may also include a light for a user to more clearly see the keys on the front panel keyboard 170, or it may include a backlight to illuminate the keys from the back side, or it may include a power LED to indicate when the TV is turned "on". Using the example of a top light over the buttons, the controller 110 turns on the light by applying a light control voltage through a light control line 150. According to the principles of the invention, the front panel keyboard 170 also applies an identification signal, such as an identification voltage, to the light control line 150, so that the controller 110 can determine a type of operational logic of the front panel keyboard 170 from the identification signal. The identification signal, of course, can be sent through a different control line. However, sharing the light control line reduces the cost of the television apparatus.

The controller 110 includes a microprocessor 115 and a FPGA (field programmable gate array) 120. The microprocessor 115 reads and writes to the FPGA 120 through a local bus 116, but other bus schemes like the I²C bus could be used. As used herein, the term "microprocessor" represents various devices including, but not limited to, microprocessors, microcomputers, microcontrollers and controllers.

The FPGA 120 includes a keyboard register 121, which includes seven bits 1-7, of which bits 1-4 and 7 are read-only and bits 5 and 6 are writeable by the microprocessor 115. The FPGA 120 includes key input buffers (receivers) 131-134 respectively coupled to the key sense lines KS1-KS4 for receiving key activation signals, converting them into logic values, and saving the respective logic values into respective bits 1-4 in the keyboard control register 121. For example, if a received key activation signal is greater than a first threshold, it is saved as logic one in the corresponding bit, and if the received key activation signal is less than a second threshold, it is saved as a logic zero. Since a logic one is normally represented by a voltage ranging from 2.0 volts to 5.0 volts, and a logic zero is normally represented by a voltage ranging from −1.0 to +1.0 volt, the first threshold should be set to 2.0 volts and the second threshold should be set to 1.0 volt. Preferably, the second threshold should be set to 0.8 volt.

The FPGA 120 includes a transceiver 140 coupled to the light control line 150. The transceiver 140 includes a receiver 136 coupled to bit 7 of the keyboard register 121, for receiving the identification signal from the front panel keyboard 170, and a transmitter 137 coupled to a register 138 for applying a voltage through the transmitter 137 to the light control line 150 for turning on a light in the front panel keyboard 170. As an example, the identification signal may be a voltage signal. In this example, when the voltage signal is greater then the first threshold, it is saved in bit 7 as a logic one and when the microprocessor 115 detects that bit 7 has a logic value of one, the microprocessor 115 determines that a type of operational logic of the front panel keyboard is positive. On the other hand, if the voltage signal is less than the second threshold, it is saved in bit 7 as logic zero and the microprocessor 115 determines that the type of operational logic of the front panel keyboard 170 is negative. A front panel keyboard with positive operational logic supplies its own operational voltage for operating the keyboard and resistive pull-downs to set the logic state to zero when no keys are depressed; whereas, a keyboard with negative operational logic requires the controller to supply the keyboard operational voltage.

When the television apparatus 100 is turned on, the microprocessor 115 applies a light control voltage to turn on the light on the front panel keyboard 170. The microprocessor 115 first sets the register 138 to a value and that value drives the output buffer 137 to a logic one, which applies an analog voltage of roughly 3.3V to control line 150. The analog voltage on control line 150 is then transmitted to the light in the front panel keyboard 170. Control line 150 illustratively includes a protection resistor R16 having a resistance of, for example, one kilo-ohm. The resistance of the protection resister R16 can be different as long as the resulting voltage is sufficient to turn on the light on the front panel keyboard as discussed in more detail later.

An optional capacitor (not shown), for example, having a capacitance of 1000 picofarads, is added, such that the capacitor and R16 form a RC circuit to roll off any edges from the clock used in the FPGA 120. The RC circuit may prevent a cable assembly attached to the FPGA 120 from radiating these clock harmonics, for satisfying FCC "open field radiation" level specifications.

According to the principles of the invention, the FPGA 120 includes a switch 130, which is controlled by bit 6 of the keyboard register 121. The switch consists of a general purpose output pin having the capability of either applying a positive voltage to the keyboard control line 145 or setting the voltage on the control line 145 to zero. In the case that a keyboard with negative logic is detected, register bit 6 is a logic zero which sets switch 130 to output a positive voltage, for example, of approximately 3.3V. This output provides a keyboard operational voltage source for keyboard control line 145, which provides the pull-up voltage for keyboard sense lines KS1-KS4. In the case of a keyboard with positive logic is detected, register bit 6 is a logic one and switch 130 provides zero volts to the keyboard control line 145. In this case, the control line provides a resistive path to ground for the KS1-KS4 lines through R5-R8. When the microprocessor 115 detects that the type of operational logic of the front panel keyboard 170 is positive, i.e., bit 7 has a logic value of one, the microprocessor 115 sets bit 6 to one, which operates the switch 130 in such a way that the keyboard operational voltage source is not sourced from the keyboard control line 145.

Figure 5:
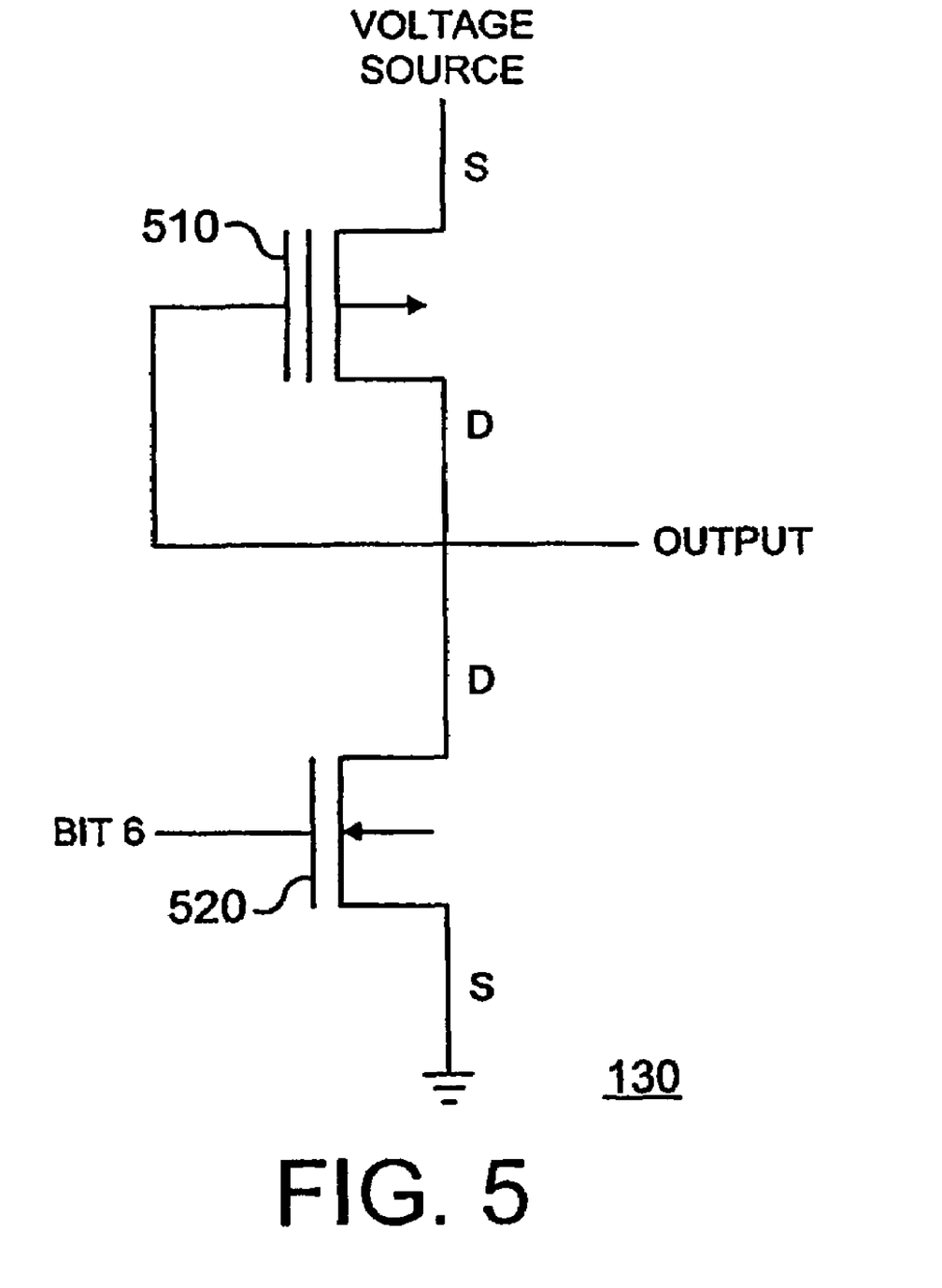
FIG. 5 is an illustrative switch used in FIG. 1 for applying an operational voltage to a front panel keyboard with negative operational logic.

Illustratively, the keyboard operational voltage is a voltage source of 3.3 volts, and the switch 130 includes a standard CMOS driver, which includes a P-Channel MOS pull-up transistor 510 and an N-MOS pull-down transistor 520, as shown in FIG. 5. When positive logic is detected, the pull-up transistor 510 serves as a normally closed switch and in this application is always in conductive state, essentially functioning as a resistor. The drain electrode of the pull-up transistor 510 serves as the source for the keyboard operational voltage, the drain electrode is coupled to a drain electrode of the N-MOS pull-down transistor 520. Due to the P-MOS device being "on" and the N-MOS device being off when a negative logic keyboard is present, the output of switch 130 is a voltage source of approximately 3.3V. This voltage source then drives keyboard control line 145 and provides a positive pull-up voltage to KS1-KS4 through the keyboard pull-up resistors R5-R8.

The N-MOS pull-down transistor 520 serves as a normally opened switch controllable by the state of bit 6. If bit 6 has a logic value of zero, the N-MOS pull-down transistor 520 is in a non-conductive state. On the other hand, if bit 6 has a logic value of one, the N-MOS pull-down transistor 520 is in a conductive state, which exhibits a very low resistance as compared to the resistance exhibited by the pull-up transistor 510. As stated above, the drain electrode of the N-MOS pull-down transistor 520 is coupled to the drain electrode of the pull-up transistor 510 for providing the output of the switch 130. The source electrode of the N-MOS pull-down transistor 520 is coupled to ground, and the gate electrode is coupled to bit 6, so that state of bit 6 controls the state of the N-MOS pull-down transistor 520 as described below.

Normally, the N-MOS pull-down transistor 520 is in a nonconductive (off) state and the operational voltage source is coupled to the keyboard control line 145. When the microprocessor 115 detects that the type of operational logic of the front panel keyboard 170 is positive, the microprocessor 115 sets bit 6 to a logic one, which applies a control voltage to the gate electrode of the N-MOS pull-down transistor 520, causing the N-MOS pull-down transistor 520 in a conductive state. As a result, the voltage at the drain electrode of the N-MOS pull-down transistor 520 is low, equivalent to grounding the keyboard control line 145. The switch 130, of course, can be implemented by other means such as a Metal-Oxide-Semiconductor Filed Effect Transistor (MOSFET).

The keyboard control line 145 couples the keyboard operational source voltage to the keyboard sense lines KS1-KS4 through resistors R5-R8, respectively. The resistances of R5-R8 are selected such that the current in the keyboard control line 145 does not exceed the current limit of the transistor implementing the switch 130. Illustratively the resistance of each of R5-R8 is 100 kilo-ohms. The output of each of R5-R8 is coupled to a point in the corresponding one of the keyboard sense lines KS1-KS4. The voltage at that point is coupled to the corresponding one of the receivers 131-135 in the FPGA 120 through a corresponding one of protection resistors R1-R4, and coupled to the front panel keyboard 170 through a corresponding one of resistors R9-R12. Illustratively the resistance of each of R1-R4 is one kilo-ohm and the resistance of each of R9-R12 is 100 ohms. Other values can be used. However, R1-R4 should be larger in resistance than R9-R12. Furthermore, when no key is activated in a front panel keyboard with negative operational logic, the receivers 131-134 should be able to receive a voltage representing a logic one.

Figure 2:
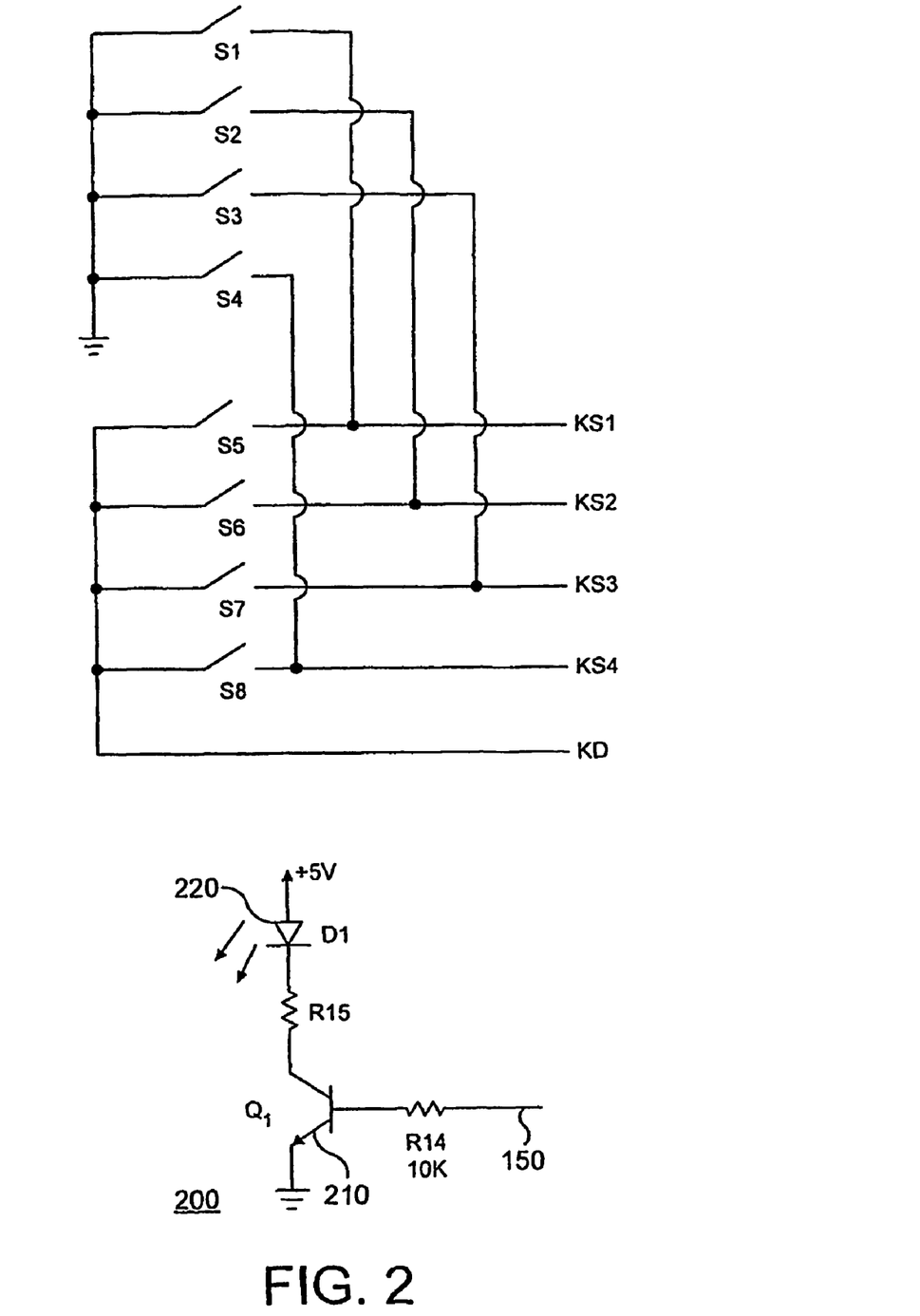
FIG. 2 is an illustrative front panel keyboard with negative operational logic to be used with the television apparatus shown in FIG. 1.

FIG. 2 illustrates a front panel keyboard 200 that uses negative operational logic and can be used with the controller 110 shown in FIG. 1. The front panel keyboard 200 includes a light 220, illustratively a light emitting diode (LED) D1, which is coupled to the light control line 150 through a transistor 210, which serves as a switch for the light 220. The collector of the transistor 210 is coupled to the light 220 though R15 and the base of the transistor 210 is coupled to a resistor R14 in the light control line 150. The resistance of R14 is selected such that when the microprocessor 115 applies a light control voltage to the light control line 150, the voltage at the base of the transistor 210 should be sufficiently high to turn on the transistor 210, so that the light 220 is turned on. Illustratively, the resistances of R14 and R15 are 10 kilo-ohms and 125 ohms, respectively.

The front panel keyboard 200 illustratively includes eight keys, represented by switches S1-S8. The number of the keys can be different depending on the need of an application. The eight keys form four pairs: S1 and S5, S2 and S6, S3 and S7, and S4 and S8. Each pair shares one of the keyboard sense lines KS1-KS4. S1 and S5 share KS1, S2 and S6 share KS2, S3 and S7 share KS3, and S4 and S8 share KS4. One terminal of a key is coupled to a keyboard sense line, while the other terminal is coupled to ground. Since the type of operational logic is negative, no keyboard operational voltage is available in the front panel keyboard 200, and no identification voltage is applied.

Since no identification voltage is applied to the light control line 150 from the front panel keyboard 200, bit 7 of the keyboard control register 121 in the FPGA 120 of the controller 110 is set to a logic zero, and the microprocessor 115 determines that the type of operational logic of the front panel keyboard 200 is negative. Consequently, the microcontroller 115 sets bit 6 of the keyboard control register to a logic zero, which keeps the switch 130 in a condition with the P-MOS transistor 510 conducting and the N-MOS pull-down transistor 520 in a non-conductive state. The output of switch 130 provides roughly 3.3V to the keyboard control line 145, and provides a keyboard operational voltage for the keyboard 200 through the keyboard pull-up resistors R5-R8. In effect, the keyboard operational voltage is the source voltage for the keyboard pull-up resistors R5-R8.

In operation, the microprocessor 115, periodically reads the keyboard control register 121. When no key is activated, i.e., in a rest state, the receivers (input buffers) 131-135 receive a voltage of about the same magnitude of the keyboard operational voltage source, which is illustratively 3.3 volts, setting bits 1-4 to a logic one. When a key is activated, i.e., a keyboard button is depressed, the received voltage by the receiver is low. In this example, the received voltage is approximately equivalent to the voltage developed across the corresponding one of R9-R12, the resistance of which is only 100 ohms. Thus, the received voltage is close to zero volts, setting the corresponding one of bits 1-4 to a logic zero.

For example, if either S1 or S5 is activated, KS1 is pulled low and bit 1 is set to logic zero. When the microprocessor 115 detects that bit 1 has a logic value of zero, the microprocessor 115 starts to scan the keyboard 200. During the scan routine, KD is set low to allow a key press on any of the 8 buttons to be detected. Once a key press is detected, the scan process includes sensing the state of KS1 by continuously reading bit 1, while setting the keyboard drive line KD high to determine which one of the two buttons (S1 or S5) is activated. The microprocessor 115 sets the keyboard drive line KD high by setting bit 5 to a logic one, resulting in applying a keyboard drive voltage to the keyboard drive line KD. When the microprocessor 115 sets the keyboard drive line KD high and bit 1 retains a value of logic zero, i.e., the KS1 remains low, the microprocessor 115 determines that key S1 is activated. Otherwise, if bit 1 is changed to a logic one, the microprocessor determines that key S5 is activated.

The reason that the change of bit 1 from a logic zero to a logic one indicates that key S5 is activated is that the applied keyboard drive voltage in the keyboard drive line KD is coupled to the keyboard sense line KS1 through the closure of key S5, causing the keyboard sense line KS1 in a high state. The microprocessor 115 then sets the keyboard drive line KD to low by setting bit 5 to zero, resulting in no voltage being applied to the keyboard drive line KD. Once activation of a key is confirmed by the scanning process, the microprocessor 115 delays for a predetermined time, such as 5 milliseconds, before repeating the scanning process to verity that the key closure was not due to "key bounce." With the process described above, the microprocessor 115 can detect activation from any of the eight keys.

Figure 3:
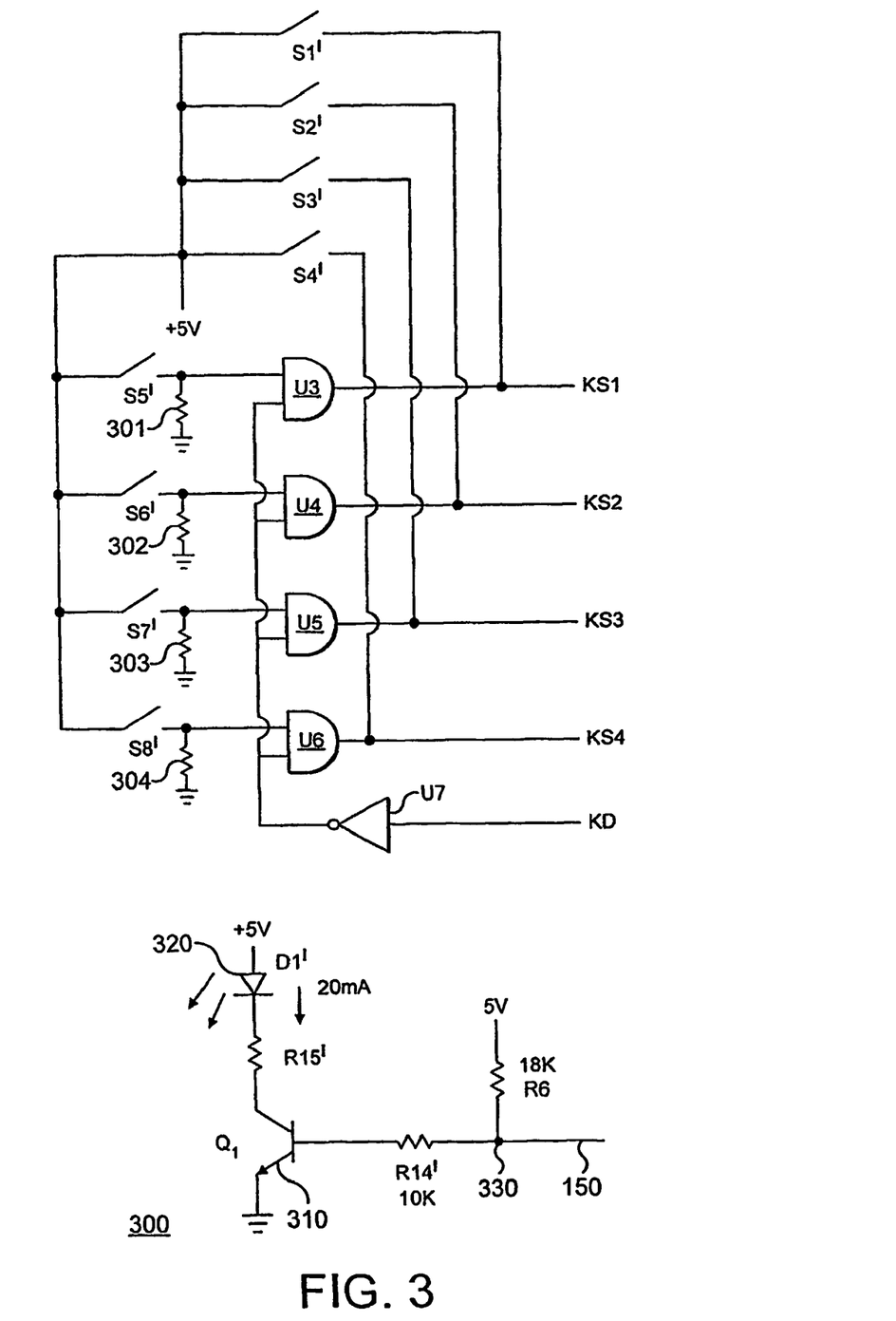
FIG. 3 is an illustrative front panel keyboard with positive operational logic to be used with the television apparatus shown in FIG. 1.

FIG. 3 illustrates a front keyboard array 300 that uses positive operational logic and can be used with the controller 110 shown in FIG. 1. Similarly to the front panel keyboard 200, the front panel keyboard 300 includes a light 320, illustratively a LED D', which is coupled to the light control line 150 through a transistor 310. The collector of the transistor 310 is coupled to the light 320 though R15' and the base of the transistor 310 is coupled to a resistor R14' to the light control line 150. The resistance of R14' is selected such that when the microprocessor 115 applies a light control voltage to the light control line 150, the voltage at the base of the transistor 310 should be sufficiently high to turn on the transistor 310, so that the light is turned on. Illustratively, the resistances of R14' and R15' are 10 kilo-ohms and 125 ohms, respectively.

Similarly, the front panel keyboard 300 includes eight keys represented by switches S'1-S'8. The eight keys form four pairs, each sharing a keyboard sense line. In particular, S'1 and S'5 share KS1, S'2 and S'6 share KS2, S'3 and S'7 share KS3, and S'4 and S'8 share KS4. Since the type of operational logic of the front panel keyboard 300 is positive, a keyboard operational voltage source (for example, 5 volts) is available to the front panel keyboard 300. In particular, one terminal of each key is coupled to the operational voltage source.

A difference between the front panel keyboard 300 and the front panel keyboard 200 is that the front panel keyboard 300 applies an identification voltage to the light control line 150 by coupling the keyboard operational voltage source (for example, 5 volts) to the light control line 150 at a junction 330 through a resistor R6, illustratively 18 kilo-ohms. The magnitudes of the keyboard operational voltage source, R6, and R14 are selected such that the voltage received by the receiver 136 is above the first threshold, so that bit 7 of the keyboard control register is set to a logic one, indicating that the type of operational logic of the front panel keyboard 300 is positive. For example, with the keyboard operational voltage source, R6, and R14' respectively having magnitudes of 5 volts, 18 kilo-ohms, and 10 kilo-ohms, the voltage received by the receiver 136 is about 2.2 volts, which represents a logic one.

When the microprocessor 115 detects that bit 7 is set to a logic one, the microprocessor 115 determines that the type of operational logic of the front panel keyboard 300 is positive and sets bit 6 to a logic one, decoupling the keyboard operational voltage source in the FPGA 120 from the keyboard control line 145.

In order to use a similar scanning process as described above for the front panel keyboard 200, the signal in the keyboard drive line KD is inverted by an inverter u1 and an AND gate (one of u3-u6) is added at the output terminal of each of keys S'5-S'8. The AND gate produces an output coupled to the corresponding keyboard sense line from the output of one of the keys S'5-S'8 and the inverted signal in the keyboard drive line KD. Note that resistors R301, R302, R303 and R304 provide a logic zero level into U3-U6 when no keyboard buttons are pressed.

In operation, the line state of a keyboard sense line during rest and active states in the front panel keyboard 300 is the inverse of that of the front panel keyboard 200. When no key is activated, the receivers receive a voltage of zero volt, i.e., the corresponding keyboard sense line is low, setting bits 1-4 to a logic zero. When a key is activated, the received voltage by the corresponding receiver is about the same magnitude of the operational voltage source, which is illustratively 5 volts, setting a corresponding one of bits 1-4 of the keyboard control register 121 in the FPGA 120 to a logic one.

For example, if S'1 is activated, the operational voltage source is coupled to the keyboard sense line KS1, setting bit 1 to a logic one. Activating the key S'5 also couples the operation voltage source to the keyboard sense line KS1. Since the microprocessor 115 normally does not apply a voltage to the keyboard drive line KD, the inverted signal is a logic one. As such, the AND gate u3 produces a logic one at the keyboard sense line KS1, which is about 2-5 volts, again setting bit 1 to a logic one. When the microprocessor 115 detects that bit 1 has a logic value of one, the microprocessor 115 starts to scan the keyboard 300.

When the microprocessor 115 sets the keyboard drive line KD high and bit 1 retains a value of a logic one, i.e., the KS1 remains high, the microprocessor 115 determines that key S'1 is activated. Otherwise, if bit 1 is changed to a logic zero, the microprocessor determines that key S'S is activated. The reason that the change of state of bit 1 indicates that key S'5 is activated is that even though the input from the activation of the key S'5 is high (a logic one), the inverted signal in KD is a logic zero, causing the output of the AND gate u3 to a logic zero. The microprocessor 115 then sets the keyboard drive line KD to low. With the process described above, the microprocessor 115 again can detect activation from any of the eight keys.

Illustratively, the LEDs D1 and D1' are LEDs having a forward voltage of about 2.5 volts at 20 milliamperes (mA). LEDs with different forward voltages can be used as well but the resistance of the series resistor (R15 or R15') should be recalculated. The transistors 210 and 310 are illustratively generic BC847B surface-mounted transistors with a Beta (current gain) of about 100 at 20 mA and a forward voltage ($V_{be-on}$) from the base to the emitter of 0.7 volts. Any transistor with a similar Beta at 20 mA and a $V_{be-on}$ of approximately 0.7 volts can be used as well.

The illustrative values of R15 and R15' are calculated based on a 5-volt source for the respective LED D1 and D1' having the illustrated properties discussed above. If the current ratings of LED D1 and D1' are changed, the resistances of R15 and R15' should be changed as well. For example, if the current is increased from 20 mA to 25 mA, the resistances of R15 and R15' should be decreased from 125 ohms to 100 ohms.

The resistances of R14 and R14' are determined based on the illustrative properties of the LED D1 and D1'. If the Beta of the LEDs increases, the resistances of R14 and R14' can be increased as well.

In the front panel keyboard 300, the combination of $V_{be-on}$ and the current through R14' from R6 determine the identification voltage present at the light control line 150. For example, with the illustrative resistances of 10 kilo-ohms and 18 kilo-ohms respectively for R14' and R6, the identification voltage present at the light control line 150 is about 2.2 volts.

Figure 4:
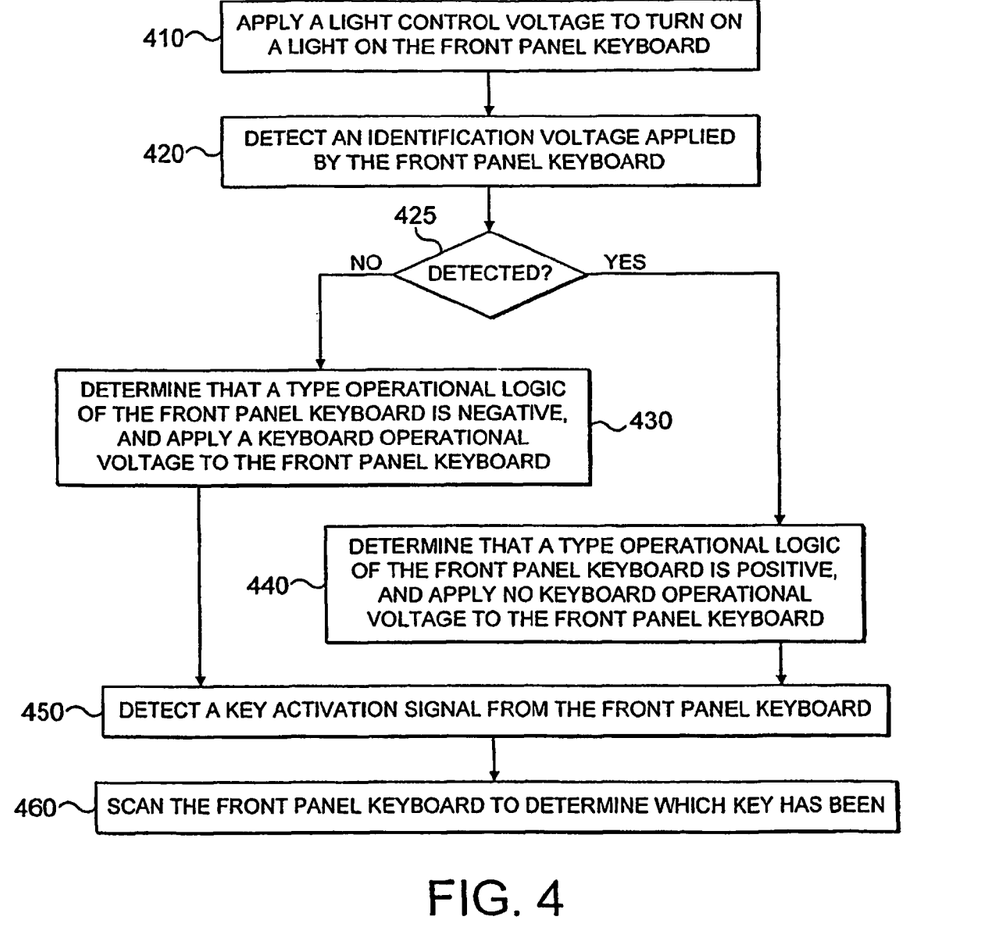
FIG. 4 illustrates a method for detecting a type of operational logic of a front panel keyboard of a television apparatus, detecting an key activation signal from the front panel keyboard, and scanning the front panel keyboard to determine which key has been activated, according to the principles of the invention.

FIG. 4 is an illustrative method of detecting a type of operational logic of a front panel keyboard of a television apparatus, detecting a key activation signal from the front panel keyboard, and scanning the front panel keyboard to determine which key has been activated, according to the principles of the invention. The television apparatus includes a controller for receiving a key activation signal from the front panel keyboard. At step 410, the controller applies a light control voltage to turn on a light in the front panel keyboard through a light control line. The function of step 410 is to light up the front panel keyboard for a user to see each key in the keyboard more clearly. As such, step 410 is optional. At step 420, the controller detects an identification voltage applied by the front panel keyboard to a first control line. The first and light control lines can be different control lines or the same control line, and the light control and identification voltages should be voltages representing logic one. In decision step 425, if the detected identification voltage is greater than the first threshold, i.e., the identification voltage is detected, the controller determines that the type of operational logic of the front panel keyboard is positive, and does not apply a keyboard operational voltage to the front panel keyboard through a keyboard control line, at step 440. Otherwise, if the detected second voltage is less than the second threshold, i.e., the identification voltage is not detected, the controller determines that the type of operational logic of the front panel keyboard is negative, and applies the keyboard operational voltage to the front panel keyboard through a keyboard control line at step 430. The controller then detects a key activation signal from the front panel keyboard at step 450, and scans the front panel keyboard to determine which key has been activated at step 460.

While this invention has been described with regard to a few presently preferred embodiments, those skilled in this art will readily appreciate that many alternative modes and embodiments can be carried out without departing from the spirit and scope of this invention.

What is claimed is:

1. A television apparatus, comprising:
   a controller; and
   a front panel keyboard coupled to the controller, the front panel keyboard using a type of operational logic, wherein the controller detects the type of operational logic of the front panel keyboard and applies a keyboard operational voltage to the front panel keyboard if the detected type of operational logic is negative, and does not apply the keyboard operational voltage to the front panel keyboard if the detected type of operational logic is positive.

2. The television apparatus of claim 1, wherein the front panel keyboard includes a light, the light is coupled to the controller through a light control line, and the controller activates the light by applying a light control voltage to the light through the light control line.

3. The television apparatus of claim 2, wherein the controller determines the type of operational logic by detecting a keyboard identification voltage at a first control line.

4. The television apparatus of claim 3, wherein if the keyboard identification voltage is greater than a first threshold, the controller determines that the type of operational logic is positive, and if the keyboard identification voltage is less than a second threshold, the controller determines that the type of operational logic is negative.

5. The television apparatus of claim 3, wherein the first control line is the light control line.

6. The television apparatus of claim 5, wherein the light control line is coupled to a light switch in the front panel keyboard for turning the light on and off.

7. The television apparatus of claim 5, wherein the front panel keyboard comprises first and second keys sharing a keyboard sense line, each of the first and second keys, when activated by a user, sending a key activation signal through the keyboard sense line to a microprocessor that operates the television apparatus according to a function assigned to the activated key.

8. The television apparatus of claim 7, wherein the controller scans the front panel keyboard to determine which of the first and second keys is activated.

9. The television apparatus of claim 8, wherein the controller scans the front panel keyboard by sending out a keyboard drive signal through a keyboard drive line to the front panel keyboard, and determines whether the key activation signal is still present.

10. The television apparatus of claim 9, wherein if the key activation signal is still present, the controller determines that the first key is activated.

11. The television apparatus of claim 9, wherein if the type of operational logic of the front panel keyboard is positive, the front panel keyboard includes a conductor coupling an identification voltage to a junction in the light control line between the switch and the controller.

12. The television apparatus of claim 9, wherein if the type of operational logic of the front panel keyboard is positive, the front panel keyboard includes an inverter to invert the keyboard drive signal.

13. The television apparatus of claim 12, wherein the front panel keyboard further includes an AND gate that generates the key activation signal from the second key and the inverted keyboard drive signal.

14. A front panel keyboard of a television apparatus, comprising:
   first and second keys sharing a keyboard sense line coupled to a controller of the television apparatus for enabling the controller to detect that one of the first and second keys has been activated;
   an inverter to invert a key drive signal from the controller, wherein the controller sends the key drive signal to detect whether a key activation signal is coming from the first key or the second key;
   an AND gate for generating the key activation signal from the second key and the inverted key drive signal; and
   a light activatable by the controller for sending a light control signal through a light control line coupled to a switch in the front panel keyboard, wherein the switch is closed to activate the light in response to the light control signal.

15. The front panel keyboard of claim 14 further comprising an identification voltage source coupled to the light control line through a first resistor, wherein the controller determines that a type of operational logic of the front panel keyboard is positive if the controller detects an identification voltage from the identification voltage source on the light control line.

16. A controller in a television apparatus including a front panel keyboard having first and second keys sharing a keyboard sense line, the controller comprising:
   a first input driver coupled to the keyboard sense line for receiving a key activation signal from the front panel keyboard to control the television apparatus according to the key activation signal;
   a first output driver for applying a keyboard operational voltage to the keyboard sense line; and
   a bidirectional driver for sending a light control signal to turn on a light in the front panel keyboard and for detecting if an identification voltage is applied from the front panel keyboard, wherein if the identification voltage is not applied, the controller, through the first output driver, applies the keyboard operational voltage to the keyboard sense line, and if the identification voltage is applied, the controller does not apply the keyboard operational voltage to the keyboard sense line.

17. The controller of claim 16, wherein the first output driver includes a switch having an input coupled to a keyboard operational voltage source and an output for providing the keyboard operational voltage, when the switch is set in an open position by the controller, the controller applies the keyboard operational voltage, and when the switch is set in a closed position, the controller does not apply the keyboard operational voltage.

18. The controller of claim 17, wherein the switch includes a P-channel metal oxide semiconductor pull-up transistor and a N-channel metal oxide semiconductor pull-down transistor, a drain electrode of the pull-up transistor serves as the input for the keyboard operational voltage source, a drain electrode of the pull-up transistor is coupled to a drain electrode of the pull-down transistor to provide the output, a gate electrode of the pull-up transistor is coupled to the output, a source electrode of the pull-down transistor is coupled to ground, and a gate electrode of the pull-up and pull-down transistor receives control signal from the controller for turning the switch on or off.

19. The controller of claim 18, wherein the keyboard operational voltage is applied to the keyboard sense line through a resistor.

20. The controller of claim 19, wherein the resistor has resistance of 100 kilo-ohms.

21. A method for detecting a type of operational logic of a front panel keyboard of a television apparatus, the television apparatus including a controller for receiving a key activation signal from the front panel keyboard, the method comprising the steps of:
- detecting if an identification voltage is applied by the front panel keyboard to a first control line;
- if the identification voltage is applied, determining that the type of operational logic of the front panel keyboard is positive and applying no keyboard operational voltage to the front panel keyboard;
- if the identification voltage is not applied, determining that the type of operational logic of the front panel keyboard is negative and applying a keyboard operational voltage to the front panel keyboard;
- detecting the key activation signal from the front panel keyboard; and
- scanning the front panel keyboard to determine which key of the front panel keyboard has been activated.

22. The method of claim 21, further comprising the step of applying a light control voltage, by the controller, to a light in the front panel keyboard through a light control line, and the light control line is used as the first control line.

23. The method of claim 22, wherein the keyboard operational voltage is applied through a switch.

24. The method of claim 23, wherein when the switch is in an open position, the keyboard operational voltage is applied, and when the switch is in a closed position, no keyboard operational voltage is applied.

* * * * *